US007710456B2

(12) United States Patent
Koshiba

(10) Patent No.: US 7,710,456 B2
(45) Date of Patent: May 4, 2010

(54) REMOTE CONTROL DEVICE, METHOD AND SYSTEM

(75) Inventor: Masaaki Koshiba, Asaka (JP)

(73) Assignee: FUJIFILM Corporation, Tokyo (JP)

(*) Notice: Subject to any disclaimer, the term of this patent is extended or adjusted under 35 U.S.C. 154(b) by 462 days.

(21) Appl. No.: 11/714,821

(22) Filed: Mar. 7, 2007

(65) Prior Publication Data

US 2007/0210932 A1 Sep. 13, 2007

(30) Foreign Application Priority Data

Mar. 9, 2006 (JP) ............................ 2006-064733

(51) Int. Cl.
*H04N 5/225* (2006.01)
*H04N 9/04* (2006.01)

(52) U.S. Cl. ............................ 348/207.1; 348/211.99; 348/333.02

(58) Field of Classification Search .............. 348/207.1, 348/211.99, 211.1, 211.4, 333.02, 376, 734
See application file for complete search history.

(56) References Cited

U.S. PATENT DOCUMENTS 6,407,779 B1 * 6/2002 Herz .......................... 348/734
7,605,846 B2 * 10/2009 Watanabe ................ 348/211.1
2003/0147010 A1 * 8/2003 Joung et al. ................. 348/565

FOREIGN PATENT DOCUMENTS

| | | |
|---|---|---|
| JP | 7-271426 | 10/1995 |
| JP | 2002-44747 | 2/2002 |
| JP | 2002-186068 | 6/2002 |
| JP | 2002-291072 | 10/2002 |
| JP | 2003-284168 | 10/2003 |
| JP | 2004-48524 | 2/2004 |

OTHER PUBLICATIONS

Koji Yamamoto, et al., "An 'Opt-Navi' System Using a Custom CMOS Image Sensor with a Function of Reading Multiple Region-of-Interests", Video Information Media Institution Journal, vol. 59, No. 12, pp. 1830-1840 (2005).
Japanese Office Action dated Feb. 2, 2010, with English translation.

* cited by examiner

*Primary Examiner*—Gevell Selby
(74) *Attorney, Agent, or Firm*—McGinn IP Law Group, PLLC

(57) ABSTRACT

According to a remote control device of the present invention, the operation situation according to the transmission of the remote control signal is judged based on a changing brightness of the image, and the information of the content according to the result of judgment is displayed. Thereby, it is possible to investigate a reaction of the apparatus to be controlled to the remote control signal, and visually indicate the reaction to the user.

9 Claims, 13 Drawing Sheets

REMOTE CONTROL DEVICE, METHOD AND SYSTEM

BACKGROUND OF THE INVENTION

1. Field of the Invention

The present invention relates to a technique for acquiring information inherent to an apparatus using an image pickup element, and remotely controlling a desired apparatus based on the acquired information inherent to the apparatus.

2. Description of the Related Art

Conventionally, there have been developed various techniques for simply controlling a desired apparatus among plural apparatuses using a single controller. For example, with Japanese Patent Application Laid-Open No. 2003-284168, a physical topology map describing the physical arrangement of plural apparatuses is accumulated beforehand in a memory within a remote controller, and the user manipulates a directional button of the remote controller according to the apparent arrangement. The remote controller selects a desired apparatus by pursuing or referring to the physical topology map according to the input of the directional button. Thereby, the user can intuitively select the desired apparatus quickly. The remote controller has a map creation part for automatically collecting the physical arrangement information of apparatuses required to create the physical topology map using the radio or network characteristics.

Also, according to Japanese Patent Application Laid-Open No. 2002-291072, a server apparatus for storing the remote control operation information corresponding to each of the remote control object apparatuses is provided, in which a portable remote control terminal has a transmitting part for transmitting the remote control operation information request data requesting the remote control operation information corresponding to the remote control operation object apparatus selected beforehand via radio communication device or a public communication line for the server apparatus, and the server apparatus transmits, to the portable remote control terminal, the remote control operation information corresponding to the remote control operation object apparatus selected based on the remote control operation information request data.

Also, according to a Non-Patent Document "Proposal for home information appliance multi remote control "Opto navigation" system using an ID reception CMOS image sensor of low power consumption having a fast reading function for partial area" (Video information media institution journal, Vol. 59, No. 12, pp. 1830-1840 (2005)), ID is received from an information home appliance, while picking up the normal image in real time, using a custom image sensor mounted on a portable telephone. The received ID is superimposed on the picked up background image and displayed on a display screen. The user can perform the operation while viewing the object apparatus on the display screen.

SUMMARY OF THE INVENTION

In the above-identified Patent Documents, the positional relation of apparatuses can be confirmed by the remote controller, but the specific content for confirming the status of the apparatuses and the reaction to the remote control are not described. In the above-identified Non-Patent Document, the specific content for confirming the reaction to the remote control is not also described.

The present invention has been achieved in the light of the above-mentioned problems, and it is an object of the invention to be able to confirm a behavior of reaction to the remote control of the desired operation object apparatus or a state of the desired operation object apparatus easily understandably.

In order to achieve the object, a first aspect of the present invention provides a remote control device comprising: an acquisition part that acquires continuously an image of an apparatus to be remotely controlled as a subject and an information inherent to the apparatus optically emitted from the apparatus using an image pickup element; a display part that superimposes and displays the image acquired continuously by the acquisition part and information inherent to the apparatus; an instruction accepting part that accepts an instruction of selecting a desired apparatus subject to remote control among the apparatuses from which the inherent information is acquired and selecting a desired control content for the selected apparatus from a user; a control signal transmission part that transmits a remote control signal to the apparatus, a remote control part that controls the control signal transmission part to transmit a remote control signal corresponding to the control content of the apparatus selected by the instruction accepting part to the apparatus selected by the instruction accepting part; and an operation situation judgment part that judges a presence or absence of the operation of the apparatus in accordance with the remote control signal depending on a changing brightness of the image acquired continuously by the acquisition part, wherein the display part displays information of the content in accordance with a judgment of the operation situation judgment part.

With the first aspect of the present invention, the operation situation according to the transmission of the remote control signal is judged based on a changing brightness of the image, and the information of the content according to the result of judgment is displayed. Thereby, it is possible to investigate a reaction of the apparatus to be controlled to the remote control signal, and visually indicate the reaction to the user.

In order to achieve the object, a second aspect of the present invention provides a remote control device comprising: an acquisition part that acquires continuously an image of an apparatus to be remotely controlled as a subject and an information inherent to the apparatus optically emitted from the apparatus using an image pickup element; a voice recognition part that recognizes the inherent voice emitted from the apparatus; a display part that superimposes and displays the image acquired continuously by the acquisition part and the information inherent to the apparatus; an instruction accepting part that accepts an instruction of selecting a desired apparatus subject to remote control among the apparatuses from which the inherent information is acquired and selecting a desired control content for the selected apparatus from a user, a control signal transmission part that transmits a remote control signal to the apparatus, a remote control part that controls the control signal transmission part to transmit a remote control signal corresponding to the control content of the apparatus selected by the instruction accepting part to the apparatus selected by the instruction accepting part; and an operation situation judgment part that judges whether or not the apparatus is operated in accordance with the remote control signal depending on whether or not the voice recognition part recognizes the inherent voice, wherein the display part displays information of the content in accordance with a judgment of the operation situation judgment part.

With the second aspect of the present invention, the operation situation according to the transmission of the remote control signal is judged based on the inherent voice uttered by the apparatus, and the information of the content according to the result of judgment is displayed. Thereby, it is possible to investigate a reaction of the apparatus to be controlled to the remote control signal, and visually indicate the reaction to the user.

The remote control part may transmit the remote control signal again if the operation situation judgment part judges that the apparatus is not operated in accordance with the remote control signal.

The remote control part may transmit the remote control signal only by a certain number of times if the operation situation judgment part judges that the apparatus is not operated in accordance with the remote control signal.

The display part may display prescribed information after the remote control part transmits the remote control signal only by the certain number of times if the operation situation judgment part judges that the apparatus is not operated in accordance with the remote control signal.

The operation situation judgment part may judge whether or not the power of the apparatus is turned on in accordance with a remote control signal corresponding to the control content that the power of the apparatus is turned on, and the display part may display information concerning the controllable content after the power of the apparatus is turned on if the operation situation judgment part judges that the power of the apparatus is turned on.

In order to achieve the object, a third aspect of the present invention provides a remote control device comprising: an acquisition part that acquires continuously an image of an apparatus to be remotely controlled as a subject and an information inherent to the apparatus optically emitted from the apparatus using an image pickup element; a display part that superimposes and displays the image acquired continuously by the acquisition part and the information inherent to the apparatus; an instruction accepting part that accepts an instruction of selecting a desired apparatus subject to remote control among the apparatuses from which the inherent information is acquired and selecting a desired control content for the selected apparatus from a user; a control signal transmission part that transmits a remote control signal to the apparatus; a remote control part that controls the control signal transmission part to transmit a remote control signal corresponding to the control content of the apparatus selected by the instruction accepting part to the apparatus selected by the instruction accepting part; and an error information recognition part that recognizes error information displayed by the apparatus from the image acquired by the acquisition part after transmitting the remote control signal, wherein the display part displays information on the error information recognized by the error information recognition part.

With the third aspect of the present invention, the error information displayed by the apparatus is recognized and information (e.g., countermeasure against the error) on the recognized error information is displayed. The user can take appropriate measure by seeing the information concerning the error information even if the remote control is not performed well.

Moreover, according to a fourth aspect of the present invention, there is provided a remote control device comprising: an acquisition part that acquires continuously an image of an apparatus to be remotely controlled as a subject and an information inherent to the apparatus or a status information of the apparatus optically emitted from the apparatus using an image pickup element; a display part that superimposes and displays the image acquired continuously by the acquisition part and the information inherent to the apparatus; an instruction accepting part that accepts an instruction of selecting a desired apparatus subject to remote control among the apparatuses from which the inherent information is acquired and selecting a desired control content for the selected apparatus from a user, a control signal transmission part that transmits a remote control signal to the apparatus; and a remote control part that controls the control signal transmission part to transmit a remote control signal corresponding to the control content of the apparatus selected by the instruction accepting part to the apparatus selected by the instruction accepting part, wherein the display part displays the status information of the apparatus acquired by the acquisition part after transmitting the remote control signal.

With the fourth aspect of the present invention, the status information of the apparatus optically emitted by the apparatus is displayed after the remote control signal is transmitted. Thereby, it is possible to visually indicate a reaction of the apparatus to be controlled to the remote control signal to the user.

Moreover, according to a fifth aspect of the present invention, there is provided a remote control device comprising: an acquisition part that acquires continuously an image of an apparatus to be remotely controlled as a subject and an information inherent to the apparatus and a status information of the apparatus optically emitted from the apparatus using an image pickup element; a display part that superimposes and displays the image acquired continuously by the acquisition part and the information inherent to the apparatus; and an instruction accepting part that accepts an instruction of selecting a desired apparatus subject to remote control among the apparatuses from which the inherent information is acquired and selecting a desired control content for the selected apparatus from a user, wherein the display part displays the status information of the apparatus selected by the instruction accepting part.

With the fifth aspect of the present invention, the status information of the apparatus optically emitted by the apparatus selected as the control object is displayed. Thereby, it is possible to visually indicate the current state of the apparatus of the control object to the user.

As one example, the status information of the apparatus includes the information concerning the charging progress situation of the apparatus.

In order to achieve the object, a sixth aspect of the present invention provides a remote control method comprising: a step of acquiring continuously an image of an apparatus to be remotely controlled as a subject and an information inherent to the apparatus optically emitted from the apparatus using an image pickup element; a step of superposing and displaying the image acquired continuously and the information inherent to the apparatus; a step of accepting an instruction of selecting a desired apparatus subject to remote control among the apparatuses from which the inherent information is acquired and selecting a desired control content for the selected apparatus from a user; a step of transmitting a remote control signal corresponding to the control content of the selected apparatus to the selected apparatus; a step of judging the presence or absence of the operation of the apparatus in accordance with the remote control signal depending on a changing brightness of the image acquired continuously; and a step of displaying information of the content in accordance with a judgment as to the presence or absence of the operation of the apparatus.

In order to achieve the object, a seventh aspect of the present invention provides a remote control method comprising: a step of acquiring continuously an image of an apparatus to be remotely controlled as a subject and an information inherent to the apparatus optically emitted from the apparatus using an image pickup element; a step of recognizing the inherent voice emitted from the apparatus; a step of superposing and displaying the image acquired continuously and the information inherent to the apparatus; a step of accepting an instruction of selecting a desired apparatus subject to remote control among the apparatuses from which the inherent information is acquired and selecting a desired control content for the selected apparatus from a user; a step of transmitting a remote control signal corresponding to the control content of the selected apparatus to the selected apparatus; a step of judging whether or not the apparatus is operated in accordance with the remote control signal depending on whether or not the inherent voice is recognized; and a step of displaying information of the content in accordance with a judgment as to the presence or absence of the operation of the apparatus.

In order to achieve the object, an eighth aspect of the present invention provides a remote control method comprising: a step of acquiring continuously an image of an apparatus to be remotely controlled as a subject and an information inherent to the apparatus optically emitted from the apparatus using an image pickup element; a step of superposing and displaying the image acquired continuously and the information inherent to the apparatus; a step of accepting an instruction of selecting a desired apparatus subject to remote control among the apparatuses from which the inherent information is acquired and selecting a desired control content for the selected apparatus from a user; a step of transmitting a remote control signal corresponding to the control content of the selected apparatus to the selected apparatus; a step of recognizing error information displayed by the apparatus from the image acquired after transmitting the remote control signal; and a step of displaying information corresponding to the recognized error information.

In order to achieve the object, a ninth aspect of the present invention provides a remote control method comprising: a step of acquiring continuously an image of an apparatus to be remotely controlled as a subject and an information inherent to the apparatus or a status information of the apparatus optically emitted from the apparatus using an image pickup element; a step of superposing and displaying the image acquired continuously and the information inherent to the apparatus; a step of accepting an instruction of selecting a desired apparatus subject to remote control among the apparatuses from which the inherent information or the status information is acquired and selecting a desired control content for the selected apparatus from a user; a step of transmitting a remote control signal corresponding to the control content of the selected apparatus to the selected apparatus; and a step of displaying the status information of the apparatus acquired after transmitting the remote control signal.

In order to achieve the object, a tenth aspect of the present invention provides a remote control method comprising: a step of acquiring continuously an image of an apparatus to be remotely controlled as a subject and an information inherent to the apparatus and a status information of the apparatus optically emitted from the apparatus using an image pickup element; a step of superposing and displaying the image acquired continuously and the information inherent to the apparatus; a step of accepting an instruction of selecting a desired apparatus subject to remote control among the apparatuses from which the inherent information and the status information are acquired and selecting a desired control content for the selected apparatus from a user; and a step of displaying the status information of the selected apparatus.

Moreover, according to an eleventh aspect of the present invention, there is provided a remote control system comprising: an apparatus that optically transmits inherent information or a status information; an acquisition part that acquires continuously an image of an apparatus as a subject and an information inherent to the apparatus or a status information of the apparatus optically emitted from the apparatus using an image pickup element; a display part that superimposes and displays the image acquired continuously by the acquisition part and the information inherent to the apparatus; an instruction accepting part that accepts an instruction of selecting a desired apparatus subject to remote control among the apparatuses from which the inherent information or the status information is acquired and selecting a desired control content for the selected apparatus from a user; a control signal transmission part that transmits a remote control signal to the apparatus; and a remote control part that controls the control signal transmission part to transmit a remote control signal corresponding to the control content of the apparatus selected by the instruction accepting part to the apparatus selected by the instruction accepting part, wherein the apparatus performs the operation according to the selected control content in response to receiving the remote control signal, and transmits the status information of the apparatus, and the display part displays the status information of the apparatus acquired by the acquisition part after transmitting the remote control signal.

Moreover, according to a twelfth aspect of the present invention, there is provided a remote control system comprising: an apparatus that optically transmits an information inherent to the apparatus and a status information of the apparatus; an acquisition part that acquires continuously an image of an apparatus as a subject and the information inherent to the apparatus and the status information of the apparatus optically emitted from the apparatus using an image pickup element; a display part that superimposes and displays the image acquired continuously by the acquisition part and the information inherent to the apparatus; and an instruction accepting part that accepts an instruction of selecting a desired apparatus subject to remote control among the apparatuses from which the inherent information and the status information are acquired and selecting a desired control content for the selected apparatus from a user; wherein the display part displays the status information of the apparatus selected from the instruction accepting part.

With the present invention, the operation situation in the transmission of the remote control signal is displayed according to a changing brightness of the image, the voice uttered by the apparatus, or the status information. Thereby, the state of the apparatus to be controlled for the remote control signal can be visually represented to the user easily recognizably.

BRIEF DESCRIPTION OF THE DRAWINGS

FIG. 5 is a view showing one example of the nth image when the power is actually turned on;

DETAILED DESCRIPTION OF THE PREFERRED EMBODIMENTS

First Embodiment

Figure 1:
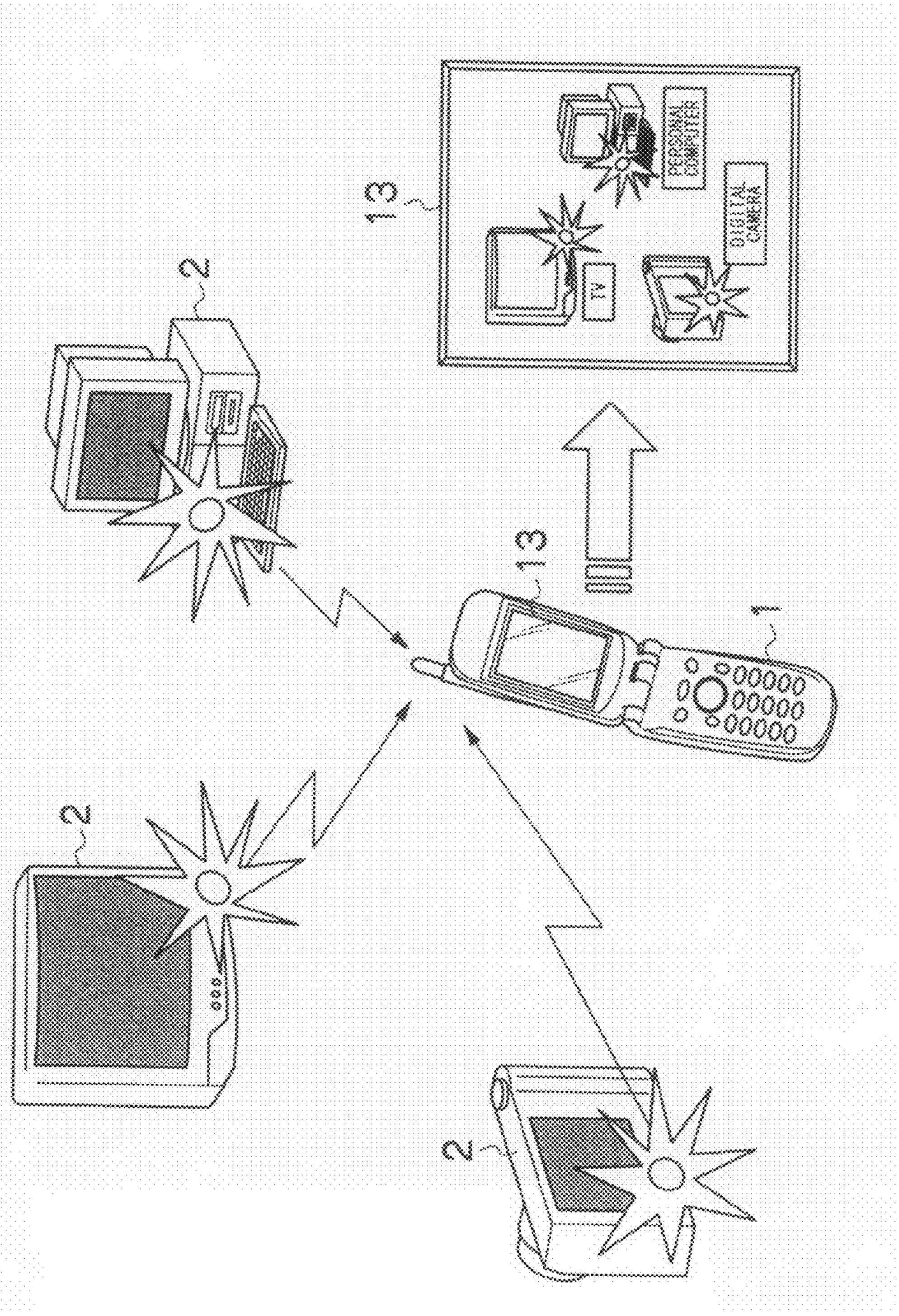
FIG. 1 is a schematic view of a remote control system.

FIG. 1 is a schematic view of a remote control system according to a preferred first embodiment of the present invention. This system comprises a remote control device 1, and other apparatuses 2 including an AV apparatus such as a television, video or stereo controlled by the remote control device 1, a personal computer, and a cooking apparatus. The remote control device 1 is connected via an external network such as a mobile communication network or the Internet, or a local area network (LAN) to each apparatus 2.

The apparatus 2 transmits an optical signal such as an infrared signal with superimposed thereon, the apparatus inherent information being inherent information of its own (any information inherent to the apparatus 2 such as identification number of the apparatus 2, ID, serial number, maker number, type number, kind of device or address on the external network). Also, it receives a remote control signal (transmitted in infrared signal or other optical signal, Bluetooth, wireless LAN or other electrical signal) from the remote control device 1.

The apparatus 2 transmits the apparatus inherent information at any time, irrespective of whether the power is turned on or off. The apparatus 2 comprises light emitting device (e.g., a television screen) for emitting light of a predetermined brightness threshold or more corresponding to the apparatus 2, if it starts the operation when the power is turned on.

Figure 2:
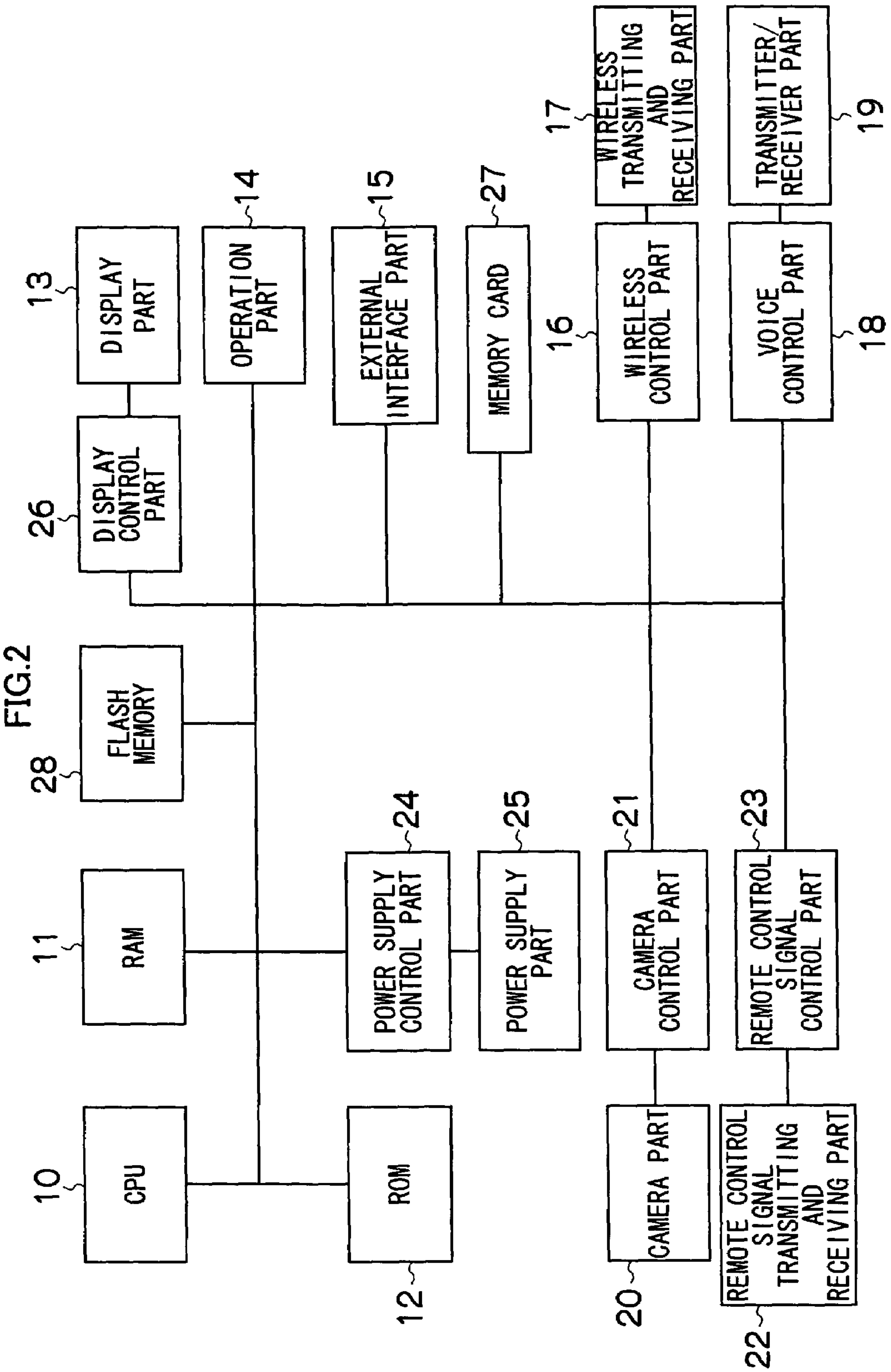
FIG. 2 is a block diagram of a remote control device.

FIG. 2 is a functional block diagram of the remote control device 1 according to a preferred embodiment of the invention. The remote control device 1 comprises a camera part 20 having an image pickup lens, a solid state image sensor such as a CMOS or CCD, the signal processing ICs such as an analog front end IC for processing an analog image read from the solid state image sensor by a driver into a digital signal and a DSP (Digital Signal Processor) for processing a digital image signal from the analog front end IC, and a camera control part 21, including a one-chip microcomputer, for controlling the image pickup operation of the camera part 20.

Also, the remote control device 1 comprises a display control part 26 that controls the display of the display part 13 in accordance with an input operation on the operation part 14 having a ten key or cross key, various kinds of operation signal received from the outside by the remote control signal transmitting and receiving part 22, an image acquired by the camera part 20 and the apparatus inherent information.

Also, the remote control device 1 comprises a CPU 10 that generally controls the operation of each part, a ROM 12 that stores various kinds of data and programs, and a RAM 11 that stores various kinds of data required for processing of the CPU 10.

Particularly, the ROM 12 stores, for each of a plurality of apparatuses 2, a control program by which the CPU 10 controls a remote control signal control part 23 or wireless control part 16 to transmit a remote control signal with the control code of the apparatus 2 superimposed in accordance with an operation on the operation part 14, and a remote control GUI that visually displays the relationship between each operation on the operation part 14 and the control code superimposed by the operation.

The image pickup lens is an optical twofold zoom lens, for example, in which a motor driver drives the image pickup lens forth or back to the telephoto (tele) side or wide-angle (wide) side in accordance with a magnification change operation inputted from the operation part 14 to change the optical zoom magnification. The magnification of the image pickup lens is not limited to the above. The image pickup lens is provided with a diaphragm, and the diaphragm is controlled via the motor driver to obtain a proper exposure.

If the photographing mode is set by the operation part 14, the CPU 10 displays a dynamic image (through image) on the display part 13, making it possible to confirm the angle of view for photographing. That is, when a subject light incidents through the image pickup lens and is formed as an image on a light receiving surface of the solid state image sensor, the solid state image sensor converts the image into signal charges according to the quantity of light. The signal charges of each pixel accumulated in this manner are sequentially read individually as a voltage signal (image signal) according to the signal charges by the driver based on a drive pulse given from a timing generator in accordance with an instruction of the CPU 10, and converted into a digital signal by an analog front end circuit, the digital signal being added to a signal processing circuit.

The signal processing circuit comprises a gain adjustment circuit and an A/D converter, and is an image processing device including a brightness/color difference signal generation circuit, a gamma correction circuit, a sharpness correction circuit, a contrast correction circuit, a white balance correction circuit, a contour processing part for making the image processing including the contour correction for photographed image, and a noise reduction processing part that makes a noise reduction process of image. The signal processing circuit processes an image signal in accordance with a command from the CPU 10.

The image data inputted into the signal processing circuit is converted onto a brightness signal (Y signal) and the color difference signals (Cr and Cl signals), subjected to a predetermined processing such as gamma correction, and then stored in a VRAM.

When the photographed image is outputted for monitor to the display part 13, the YC signals are read from the VRAM, and sent to a display control part 26. The display control part 26 converts the inputted YC signals into the signals in a prescribed format (e.g., color composite video signals of NTSC system) and outputs them to the display part 13.

The YC signals for each frame processed at a predetermined frame rate are alternately written into an A area and a B area of the VRAM, and the written YC signals are read from any one of the A area and the B area in the VRAM other than where the YC signals are being written. In this manner, the YC signals within the VRAM are periodically rewritten and the video signal generated by the YC signals is supplied to the display part 13, so that the video in the picked up image is displayed on the display part 13 in real time. The user can confirm the angle of view for photographing with the video (through) displayed on the display part 13.

Herein, if a photographing key provided on the operation part 14 is pressed, a photographing operation for storage is started. The image data acquired in response to pressing of the photographing key is converted into the brightness/color difference signal (Y/C signals) in the signal processing circuit, subjected to a predetermined process such as gamma correction, and stored in the RAM 11.

The Y/C signals stored in the RAM 11 are compressed in a predetermined format by a compression/expansion processing circuit, and stored as an image file such as an Exif file in a predetermined format in a memory card 27. The image file may be also stored in a flash memory 28.

If a reproduction mode is set up by the operation part 14, the compressed data in the last image file (lastly stored file) stored in the memory card 27 is read out. In the case where the lastly stored file is a still image file, this read image compressed data is expanded into the decompressed YC signals by the compression/expansion processing circuit, and saved in the VRAM. The YC signals saved in the VRAM are added to the display control part 26. The display control part 26 creates the RGB color composite signals of NTSC system from the input YC signals, and outputs them to the display part 13. Thereby, a frame image of the last frame stored in the memory card 27 is displayed on the display part 13.

Thereafter, if a right key of the cross key provided on the operation part 14 is pressed, the frame is advanced in the forward direction, whereas if a left key of the cross key is pressed, the frame is advanced in the reverse direction. And the image file at the frame position after frame advance is read out of the memory card 27, so that the frame image is reproduced on the display part 13 in the same manner as above. If the frame is advanced in the forward direction in a state where the frame image of the last frame is displayed, the image file of the first frame stored in the memory card 27 is read out, so that the frame image of the first frame is reproduced on the display part 13.

The number of pixels in the image file to be stored is 2832×2128 (6M), 2048×1536 (3M), 1280×960 (1M) or 640×480 (VGA), whereby the data amount (file size) of the photographed image is changed depending on a combination of the quality of stored image and the number of stored pixels.

The remote control device 1 may be comprised of a portable telephone with camera or a digital camera, as described in the "Proposal for home information appliance multi remote control "Opto navigation" system using an ID reception CMOS image sensor of low power consumption having a fast reading function for partial area", Video information media institution journal, Vol. 59, No. 12, pp. 1830-1840 (2005), for example. In this embodiment, the block (memory card 27 or flash memory 28) for recording or saving the image is not requisite.

A remote control signal transmitting and receiving part 22 comprises a light receiving element. Though the camera part 20 and the remote control signal transmitting and receiving part 22 are separately provided in FIG. 2, the light receiving element is common to the solid state image sensor of the camera part 20. Therefore, if the camera part 20 picks up the image of the apparatus 2 as the subject, the apparatus inherent information optically emitted by each apparatus 2 can be acquired along with the image.

The remote control signal control part 23 converts the apparatus inherent information superimposed on the optical signal incident from the external apparatus 2 on the remote control signal transmitting and receiving part 22 into digital data and outputs it to the CPU 10.

The CPU 10 reads a table defining the control code inherent to the apparatus 2 specified by the apparatus inherent information from the ROM 12 into the RAM 11 in accordance with the apparatus inherent information inputted from the remote control signal control part 23. And the control code of the specific apparatus 2 is read from the RAM 11 in accordance with an operation of the operation part 14, and sent to the remote control signal control part 23.

The remote control signal transmitting and receiving part 22 comprises optical signal transmitting device including a light emitting diode or an infrared LED. The remote control signal control part 23 transmits an optical signal with the control code instructed by the CPU 10 and other data superimposed to the apparatus 2. In this manner, the remote control device 1 sends an optical control signal to the apparatus 2, so that the operation part 14 can remotely operate the specific apparatus 2.

Also, the remote control device 1 comprises a wireless transmitting and receiving part 17 that transmits or receives a wireless signal such as mobile communication electric wave, IrDA, Bluetooth, wireless LAN or Wireless USB to or from the apparatus 2, a wireless control part 16 that converts the received wireless signal into data and sends it to the CPU 10, or superimposes the remote control signal instructed by the CPU 10 on the wireless signal, and an external interface part 15 that communicates with various kinds of home electric appliance 2 such as a personal computer or a printer in accordance with the USB or other standards.

The CPU 10 may read the control code of the specific apparatus 2 according to the operation of the operation part 14 from the RAM 11, and send it to the wireless control part 16. The wireless control part 16 transmits a wireless signal with the control code inputted from the CPU 10 and other data superimposed to the apparatus 2. This wireless signal arrives at the apparatus 2 via the LAN or external network. The apparatus 2, receiving the control code, performs the operation according to the control code. In this manner, if the wireless signal is sent from the remote control device 1 to the apparatus 2, the specific apparatus 2 can be remotely controlled by the operation part 14.

The remote control apparatus 1 comprises a transmitter/receiver part 19 having a loudspeaker device such as a speaker uttering the voice and a receiving device such as a microphone receiving the voice and converting it into electrical signal, and a sound control part 18 that controls the utterance content of the loudspeaker device. The sound control part 18 has a function of recognizing a specific sound pattern designated by the CPU 10 from the sound signal inputted from the transmitter/receiver part 19.

The CPU 10 may read the control code of the specific apparatus 2 according to the sound received by the transmitter/receiver part 19 from the RAM 11, and send it to the remote control signal control part 23 or the wireless control part 16. That is, the designation of the control code emitted in terms of the optical signal or wireless signal to the specific apparatus 2 is not limited to the input operation on the operation part 14, but may be made by voice input.

Also, the CPU 10 selects which of the remote control signal transmitting and receiving part 22 or wireless transmitting and receiving part 17 transmits the control code in accordance with the input operation on the operation part 14 or the voice to the transmitter/receiver part 19. In this case, if the remote control device 1 is in front of the apparatus 2 of control object, the control code may be emitted from the remote control signal transmitting and receiving part 22. If not, the user instructs the CPU 10 that the control code is to be transmitted from the wireless transmitting and receiving part 17 by an input operation on the operation part 14 or the voice to the transmitter/receiver part 19. The CPU 10 controls the wireless transmitting and receiving part 17 to transmit the control code in accordance with this instruction.

Figure 3:
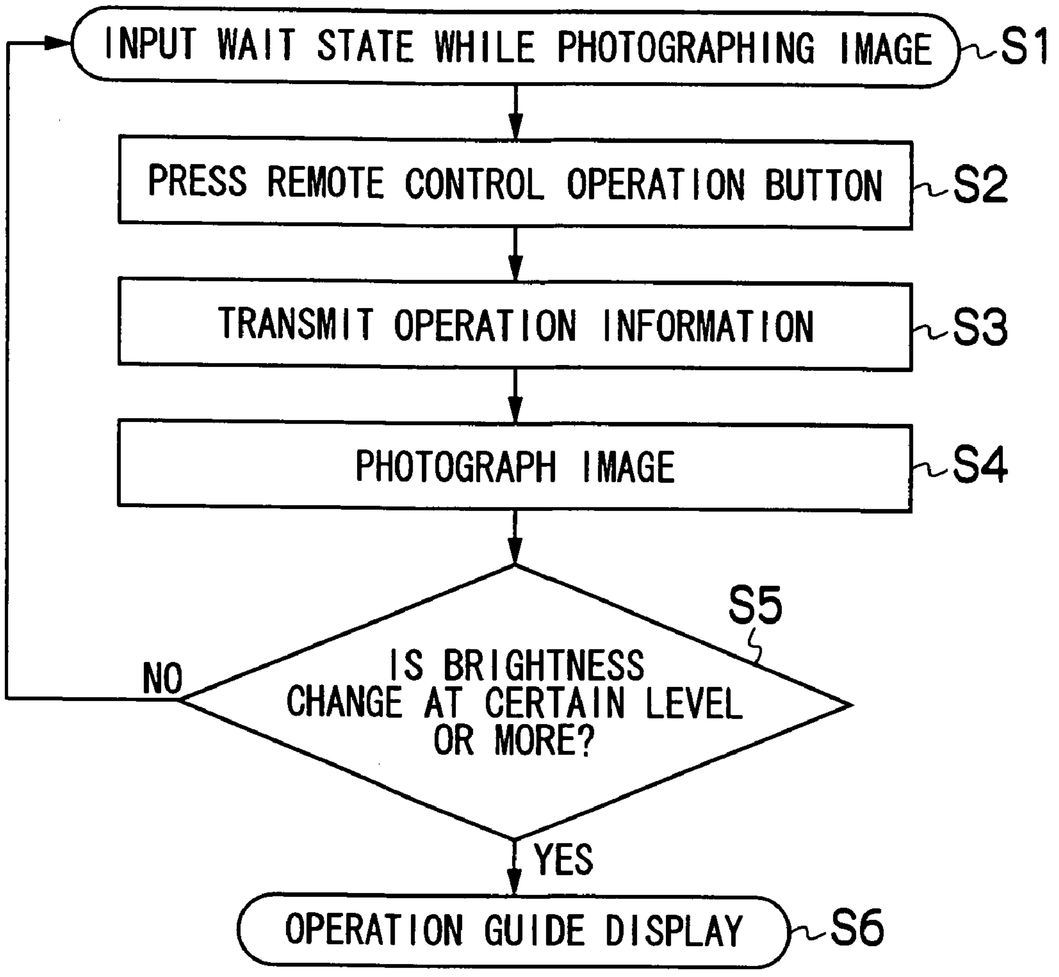
FIG. 3 is a flowchart showing the flow of a remote operation process according to a first embodiment of the invention.

FIG. 3 is a flowchart showing the flow of a remote operation process according to the first embodiment of the present invention.

Figure 4:
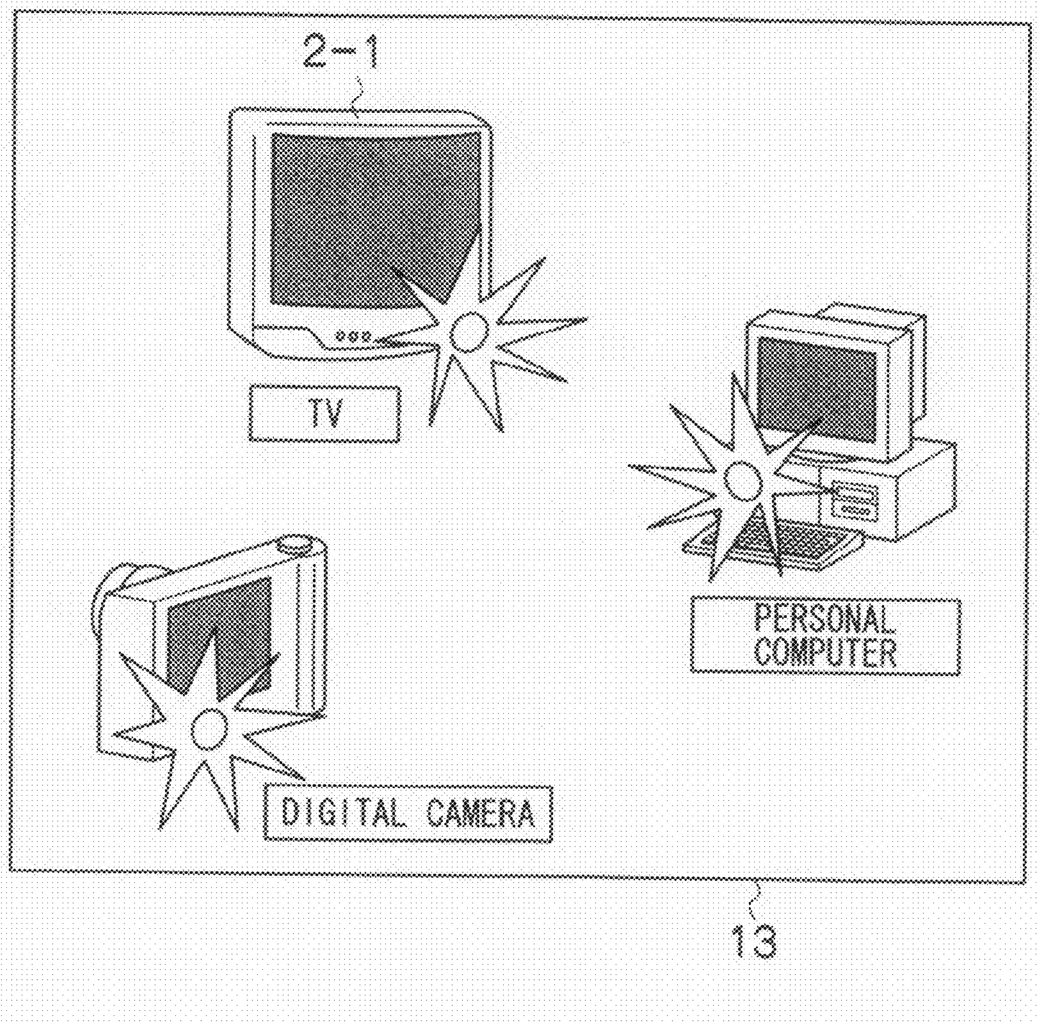
FIG. 4 is a view showing one example of a still image.

First of all, at S1, the CPU 10 instructs the camera control part 21 to start the still image acquisition operation in accordance with an image pickup instruction inputted on the operation part 14 or an image pickup instruction inputted into the transmitter/receiver part 19. The camera control part 21 controls the camera part 20 to acquire the still image n0 and the apparatus inherent information. The still image is once stored in the RAM 11. FIG. 4 shows one example of the still image n0.

The CPU 10 identifies the image acquired by the camera part 20 and each apparatus 2 arranged as the subject in the image based on the apparatus inherent information. The CPU 10 instructs the display control part 26 to display the still image with the apparatus inherent information of the identified apparatus 2 superimposed on the display part 13.

At S2, by an indication on the display part 13 or a voice guide on the transmitter/receiver part 19, the CPU 10 prompts the user to select a desired one of the apparatuses 2 for which the power is turned on among the identified apparatuses 2 by a manual input on the operation part 14 or a voice input into the transmitter/receiver part 19. The CPU 10 selects the apparatus 2 in accordance with the manual input on the operation part 14 or the voice input into the transmitter/receiver part 19.

The CPU 10 reads a control program corresponding to the selected apparatus 2-1 from the ROM 12 into the RAM 11 and executes it.

At S3, in accordance with the manual input on the operation part 14 or the voice input into the transmitter/receiver part 19, the CPU 10 instructs the remote control signal control part 23 to send a control code defining the control content that the power is turned on from the remote control signal transmitting and receiving part 22, the wireless transmitting and receiving part 17 or the external interface part 15 to the selected apparatus 2-1.

At S4, the solid state image sensor of the camera part 20 repeats the exposure at regular intervals, and photographs the image every time. The nth image that is the image obtained by the nth exposure is converted into digital data and sent to the CPU 10.

The CPU 10 sets an area where the apparatus inherent information of the selected apparatus 2-1 is acquired within the image obtained by each exposure to the detection area. The CPU 10 integrates the brightness values of the still image n0 and the detection area of the nth image obtained by each exposure, calculates a difference $\Delta n$ in the brightness value between the still image n0 and the nth image and temporarily stores it in the RAM 11.

Figure 5:
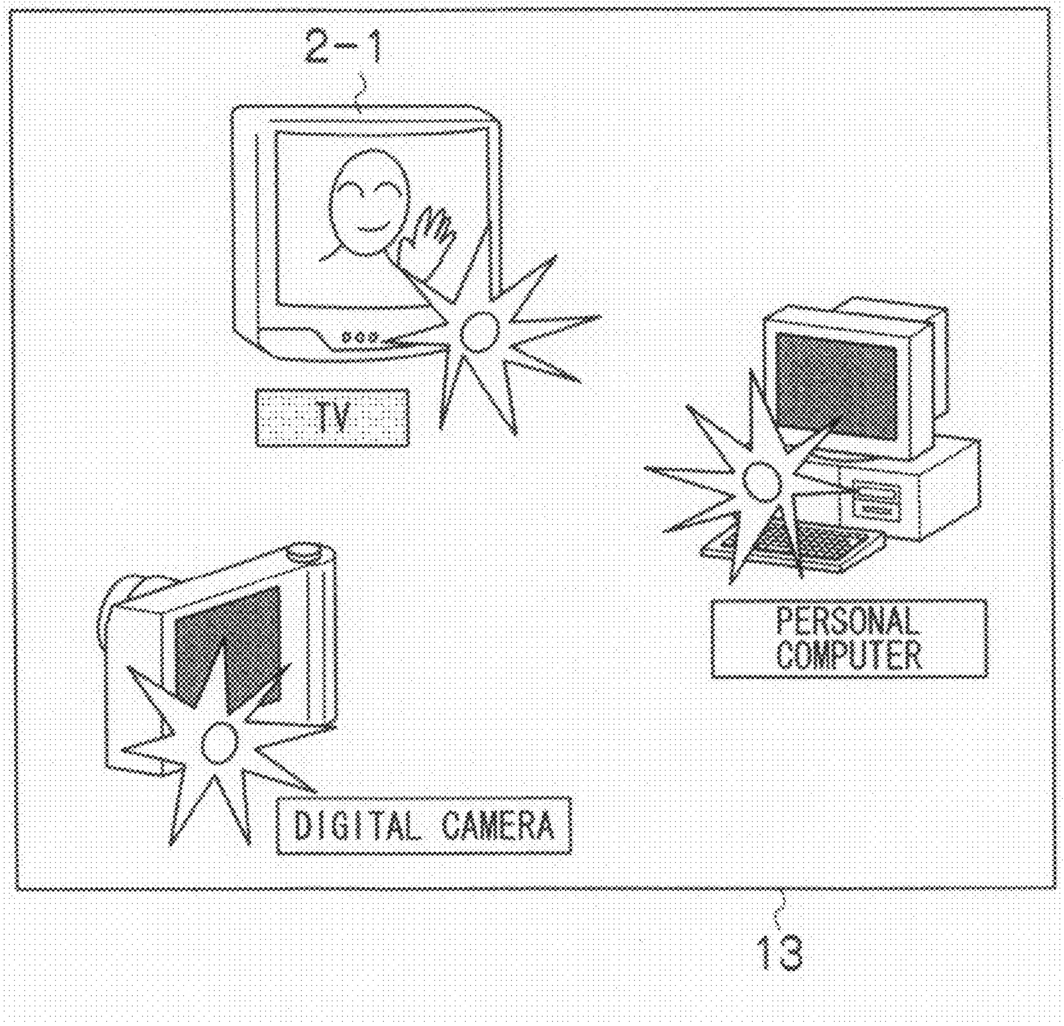

At S5, the CPU 10 judges whether or not the power of the selected apparatus 2-1 is actually turned on by comparing the difference $\Delta n$ in the brightness value with a brightness threshold T corresponding to the apparatus 2-1 selected at S2 among the brightness thresholds prestored in the ROM 12. That is, the CPU 10 judges whether or not the difference $\Delta n$ is greater than or equal to the threshold T. If $\Delta n \geqq T$, the operation goes to S6, judging that the power of the apparatus 2-1 is actually turned on, whereas if $\Delta n < T$, the operation returns to S1, judging that the power of the apparatus 2-1 is not actually turned on. FIG. 5 shows one example of the nth image when the power is actually turned on.

The brightness threshold T may be transmitted from the apparatus 2 as the apparatus inherent information, or received via the network from the apparatus 2.

Figure 6:
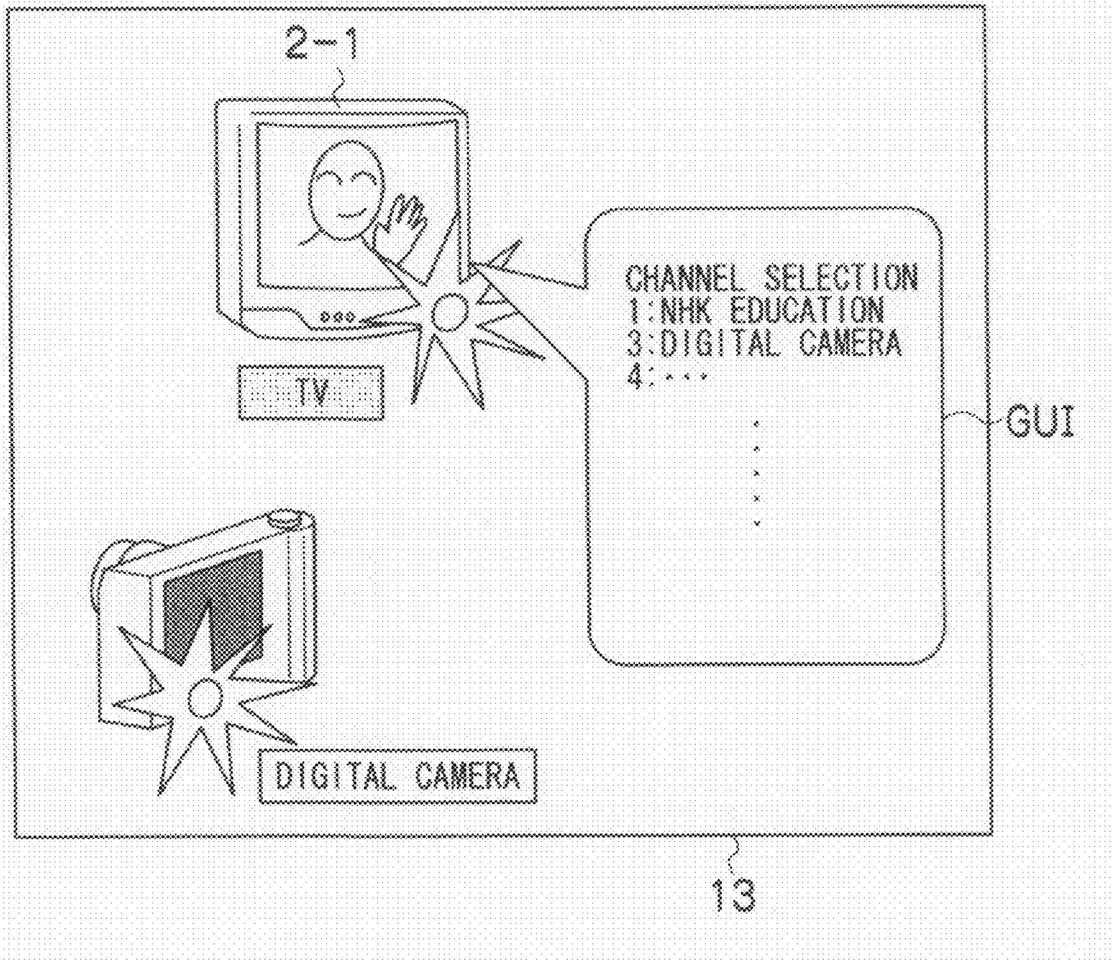
FIG. 6 is a view showing one example of displaying a GUI superimposed on the image.
Figure 7:
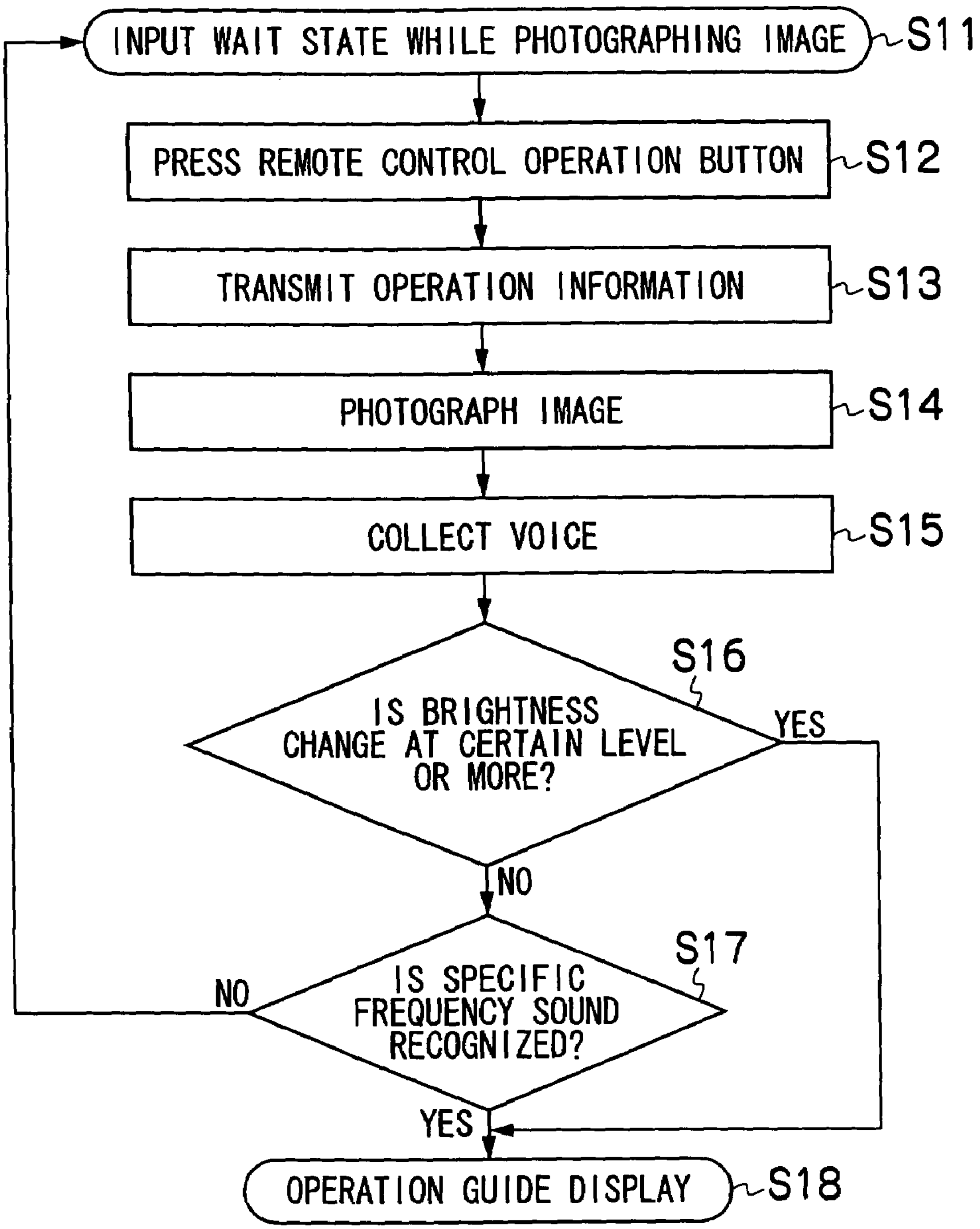
FIG. 7 is a flowchart showing the flow of a remote operation process according to a second embodiment of the invention.

At S6, the CPU 10 reads a GUI corresponding to various kinds of operation (e.g., turning up or down the voice volume or changing the channel) of the selected apparatus 2-1 from the ROM 12 into the RAM 11 in accordance with an instruction of the control program and instructs the display control part 26 to display the GUI on the display part 13. As shown in FIG. 6, the GUI may be superimposed on the nth image and displayed.

In this manner, when the remote control device 1 sends the remote control signal of power on to the desired apparatus 2, whether or not the power of the apparatus 2 is actually turned on is judged by comparing the difference value in the brightness with the brightness threshold. If it is judged that the power is turned on, the GUI for operation after turning on the power of the apparatus 2 is displayed. In this manner, the following remote control may be assisted in accordance with a reaction to the control signal for turning on the power of the selected apparatus 2.

Second Embodiment

While in the first embodiment it is judged whether or not the power of the apparatus 2 is actually turned on based on the difference value in the brightness, it may be judged whether or not the power of the apparatus 2 is actually turned on depending on whether or not the voice uttered from the apparatus 2 is a predetermined voice.

FIG. 6 is a flowchart showing the flow of a remote operation process according to the second embodiment.

First of all, at S11, the CPU 10 instructs the camera control part 21 to start a still image acquisition operation in accordance with an image pickup instruction inputted on the operation part 14 or an image pickup instruction inputted into the transmitter/receiver part 19. The camera control part 21 controls the camera part 20 to acquire the still image n0 and the apparatus inherent information. The still image is once stored in the RAM 11.

The CPU 10 identifies the image acquired by the camera part 20 and each apparatus 2 arranged as the subject in the image based on the apparatus inherent information. The CPU 10 instructs the display control part 26 to display the still image with the apparatus inherent information of the identified apparatus 2 superimposed thereon on the display part 13.

At S12, by an indication on the display part 13 or a voice guide on the transmitter/receiver part 19, the CPU 10 prompts the user to select a desired one of the apparatuses 2 for which the power is turned on among the identified apparatuses 2 by a manual input on the operation part 14 or a voice input into the transmitter/receiver part 19. The CPU 10 selects the apparatus 2 in accordance with the manual input on the operation part 14 or the voice input into the transmitter/receiver part 19.

The CPU 10 reads a control program corresponding to the selected apparatus 2-1 from the ROM 12 into the RAM 11 and executes it.

At S13, in accordance with the manual input on the operation part 14 or the voice input into the transmitter/receiver part 19, the CPU 10 instructs the remote control signal control part 23 to transmit a control code defining the control content that the power is turned on from the remote control signal transmitting and receiving part 22, the wireless transmitting and receiving part 17 or the external interface part 15 to the selected apparatus 2-1.

At S14, the solid state image sensor of the camera part 20 repeats the exposure at regular intervals, and photographs the image every time. The nth image that is an image obtained by the nth exposure is converted into digital data and sent to the CPU 10.

The CPU 10 sets an area where the apparatus inherent information of the selected apparatus 2-1 is acquired within the image obtained by each exposure to the detection area.

The CPU 10 integrates the brightness values of the still image n0 and the detection area of the nth image obtained by each exposure, calculates a difference Δn in the brightness value between the still image n0 and the nth image and temporarily stores it in the RAM 11.

At S15, the CPU 10 collects the frequency pattern of voice inputted into the transmitter/receiver part 19, and stores it in the RAM 11.

At S16, the CPU 10 judges whether or not the power of the selected apparatus 2-1 is actually turned on by comparing the difference Δn in the brightness value with a brightness threshold T corresponding to the apparatus 2 selected at S12 among the brightness thresholds prestored in the ROM 12. That is, the CPU 10 judges whether or not the difference Δn is greater than or equal to the threshold T. If Δn≧T, the operation goes to S18, judging that the power of the apparatus 2-1 is actually turned on, whereas if Δn<T, the operation returns to S11, judging that the power of the apparatus 2-1 is not actually turned on.

At S17, the CPU 10 compares the frequency pattern of voice collected at S15 with the frequency pattern of voice corresponding to the selected apparatus 2-1 (e.g., frequency pattern of chime sound uttered in starting the apparatus 2-1) among the frequency patterns of voice prestored in the ROM 12. And if both are matched, the operation goes to S18, judging that the power of the apparatus 2 is turned on, whereas if both are not matched, the operation returns to S11, judging that the power of the apparatus 2 is not turned on. The frequency pattern of voice may be transmitted as the apparatus inherent information from the apparatus 2. Alternatively, it may be received from the apparatus 2 via the network.

At S17, the CPU 10 reads a GUI corresponding to various kinds of operation of the selected apparatus 2-1 from the ROM 12 into the RAM 11 in accordance with an instruction of the control program and instructs the display control part 26 to display the GUI on the display part 13.

The judgment at S17 is fundamentally irrelevant to the judgment at S16, and both judgments may not be necessarily combined. However, the judgment at S16 may be incorrect due to influence of outdoor daylight. If the judgment with voice at S17 is complementarily added to the judgment at S16, the judgment as to whether the power of the apparatus 2 is turned on is made more correctly.

In this manner, when the remote control device 1 transmits the remote control signal of power on to the desired apparatus 2, whether or not the power of the apparatus 2 is actually turned on is judged based on the voice pattern. Particularly, even if the brightness change is small or does not exist when the power of the apparatus 2 is turned on, and it is difficult to judge whether or not the power is turned on based on the comparison with the brightness threshold, it is possible to judge whether or not the power of the apparatus 2 is turned on complementarily with the voice.

Third Embodiment

In some cases, the power of the apparatus 2 may not be turned on due to such a cause that the incident angle of optical signal from the wireless transmitting and receiving part 17 to the apparatus 2 is too large even if the remote control signal is transmitted. In this case, the remote control signal may be resent only by a certain number of times. Further, if the power of the apparatus 2 is not turned on after the remote control signal is resent by the certain number of times, an error message may be displayed on the screen or notified by voice.

Figure 8:
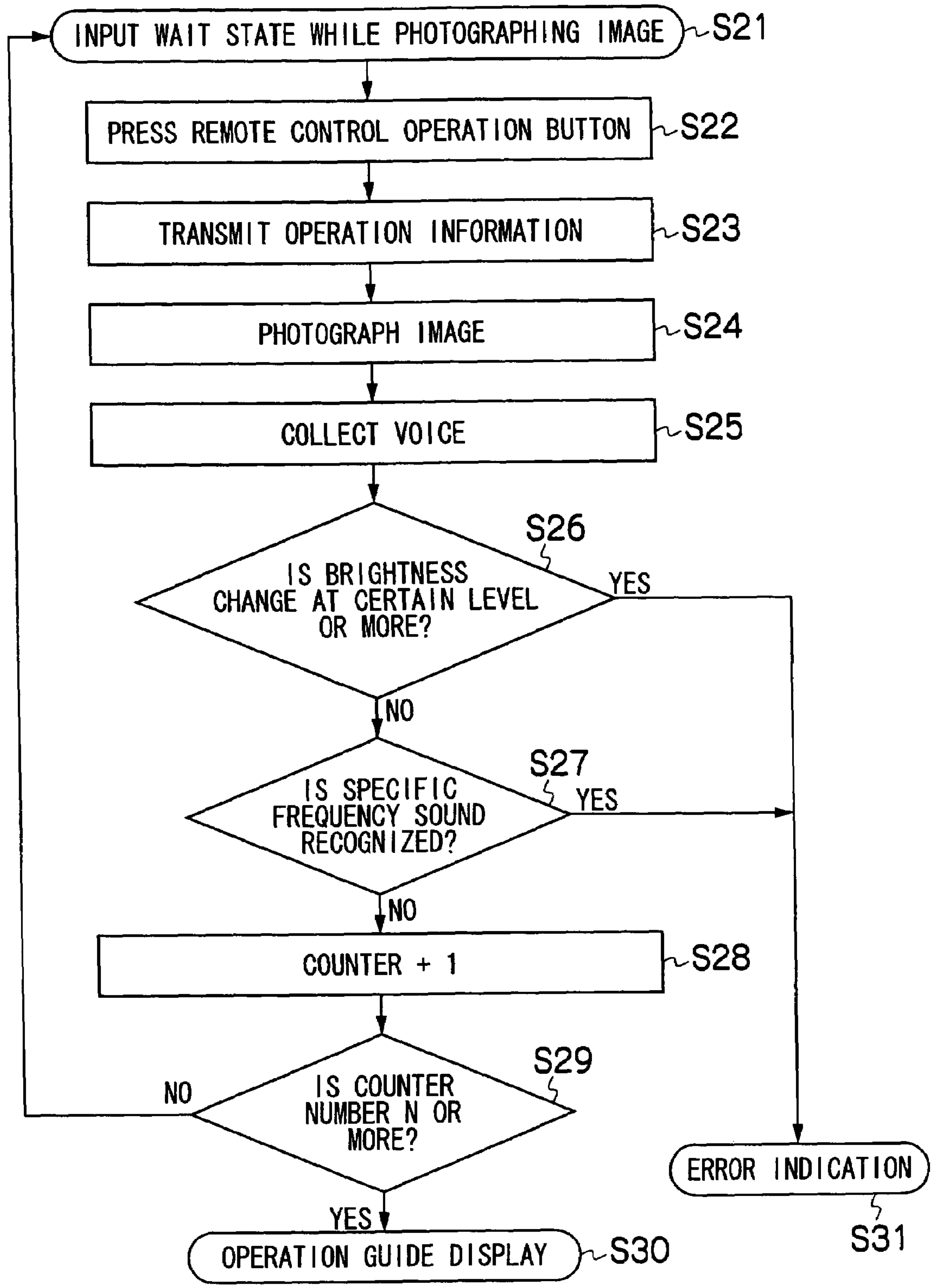
FIG. 8 is a flowchart showing the flow of a remote operation process according to a third embodiment of the invention.

FIG. 8 is a flowchart showing the flow of a remote operation process according to a third embodiment of the invention.

The steps S21 to S27 are the same as the steps S11 to S17 of the second embodiment. However, if it is judged that the power is turned on at S26, the operation goes to S31, or if it is judged that the power is not turned on at S26, the operation goes to S27. Also, if it is judged that the power is turned on at S27, the operation goes to S31, or if it is judged that the power is not turned on at S27, the operation goes to S28.

At S28, the CPU 10 increments the transmission number m (initial value is 0) of the remote control signal by one, and stores it in the RAM 11.

At S29, the CPU 10 judges whether or not the transmission number m reaches a predetermined number of times n (e.g., 10) to cutting off resending the remote signal. If m≧N, the operation goes to S30, or if m<N, the operation returns to S23.

Figure 9:
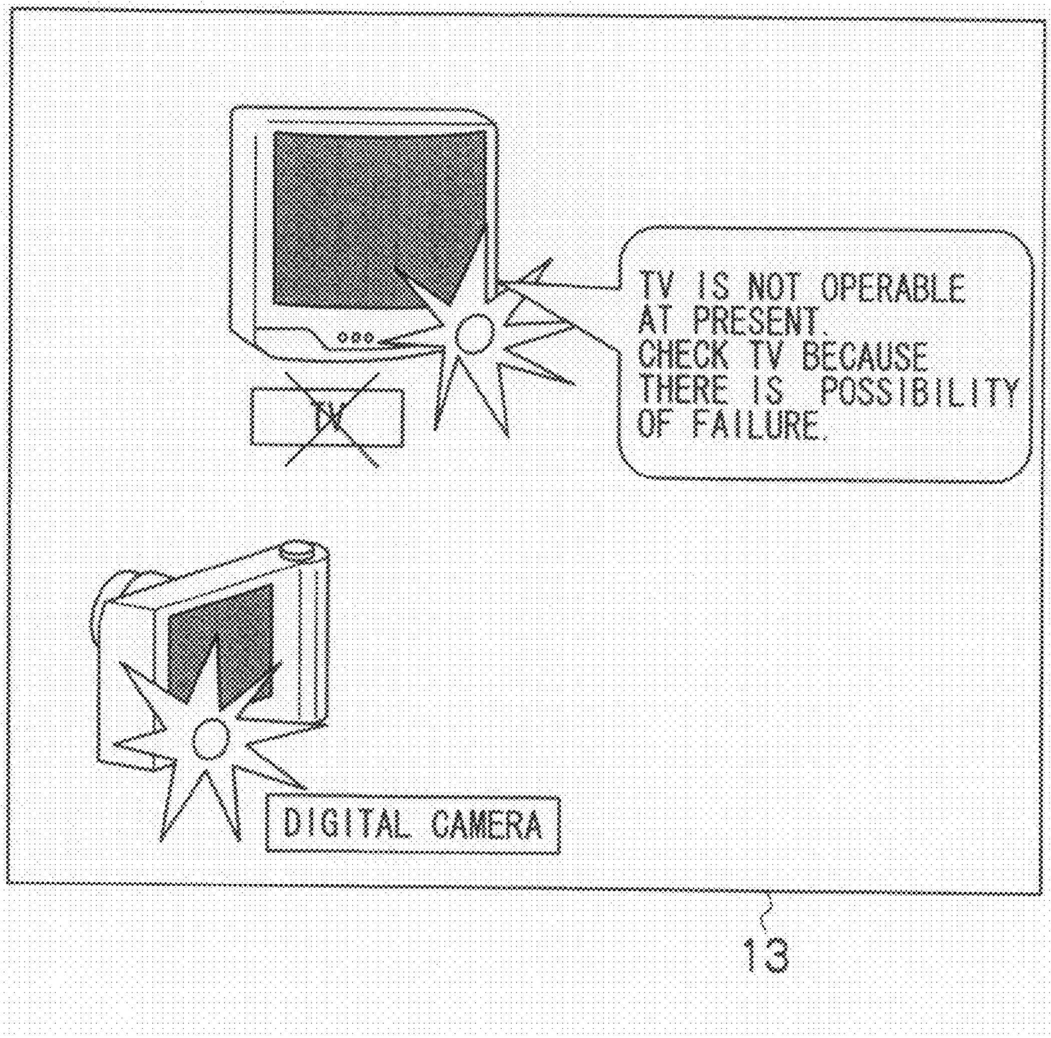
FIG. 9 is a view illustrating a state where an error message superimposed on the still image is notified.

At S30, the CPU 10 notifies the display part 13 or the transmitter/receiver part 19 of an error message indicating that the power of the apparatus 2 is not turned on. FIG. 9 shows a state where the still image with the error message superimposed is displayed on the display part 13.

The step S31 is the same as the step S18 of the second embodiment.

Fourth Embodiment

In the first to third embodiments, the apparatus 2 has a display unit, and when an error code is displayed on the display unit, the remote control device 1 may make the image recognition for the error code on the display unit of the apparatus 2, and notify pertinent information of the error code.

Figure 10:
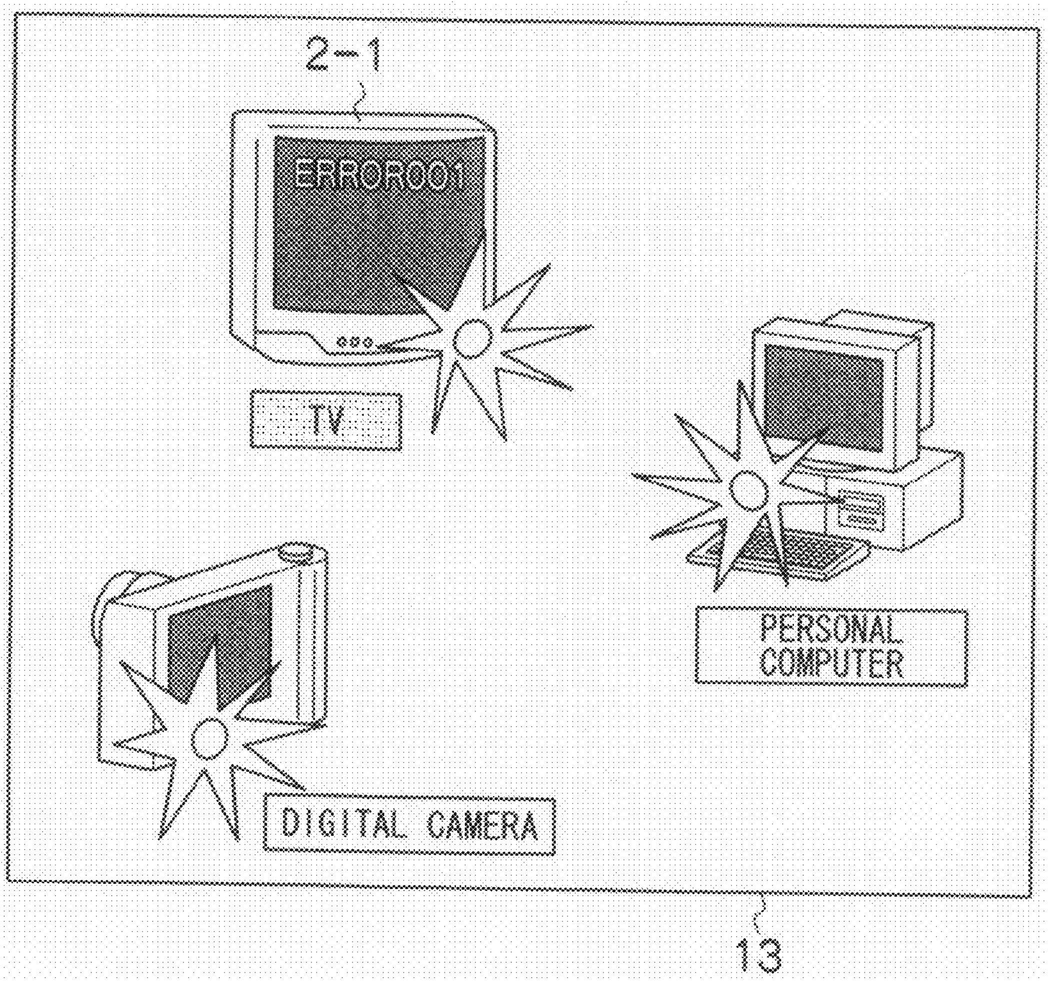
FIG. 10 is a view illustrating a state where an error code is displayed on the screen of a television apparatus.

For example, suppose that an error code "ERROR001" is displayed on the screen of the television that is the apparatus 2 selected as the operation object, as shown in FIG. 10. The CPU 10 of the remote control device 1 recognizes the error code from the still image (preferably near the inherent information detection area of the apparatus 2) continuously obtained from the camera part 20 by collating it with the image pattern of the error code prestored on the ROM 12.

The remote control device 1, after acquiring the apparatus inherent information, accesses the address of the apparatus 2 included in the apparatus inherent information, makes a request to send the image pattern of the error code inherent to the apparatus 2, receives the image pattern of the error code from the apparatus 2 in response to this request, and stores it in the ROM 12.

Figure 11:
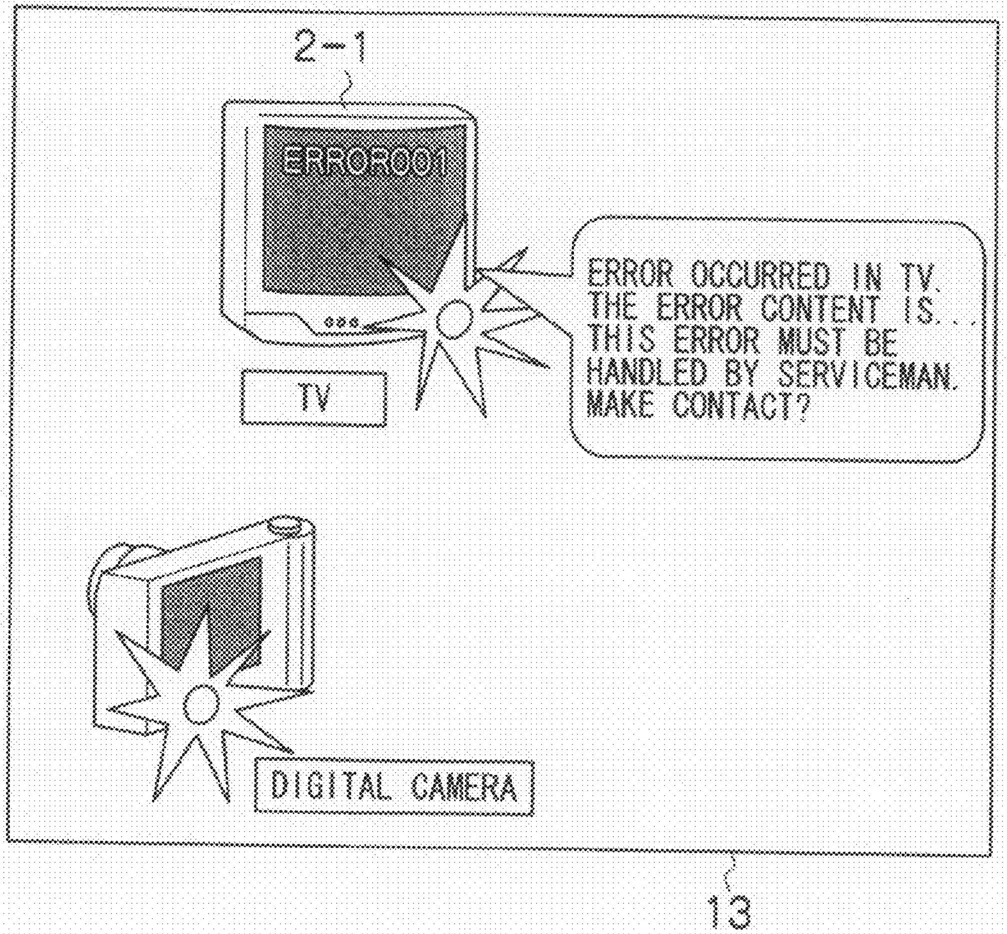
FIG. 11 is a view illustrating how the error information is displayed.

The remote control device 1 recognizes the error code, reads the error information such as error content, error countermeasure and so on from the ROM 12, and displays it on the screen of the display part 13 or notifies it by voice from the transmitter/receiver part 19. FIG. 11 shows how the error information is displayed on the display part 13.

If recognizing the error code of the apparatus 2, the remote control device 1 may access the address of the apparatus 2, make a request to send data describing the error information of recognized error code such as error content, countermeasure and so on, receive the error information from the apparatus 2 in response to this request, and store it in the ROM 12.

Fifth Embodiment

After the power is turned on, the apparatus 2 may transmit information on the state of the apparatus, instead of the apparatus inherent information, or as the apparatus inherent information. The information on the state of the apparatus may include the remaining amount of battery, the residual memory, the number of frames left for photographing, the remaining capacity of HDD, or the pot hot water heating time, for example.

Figure 12:
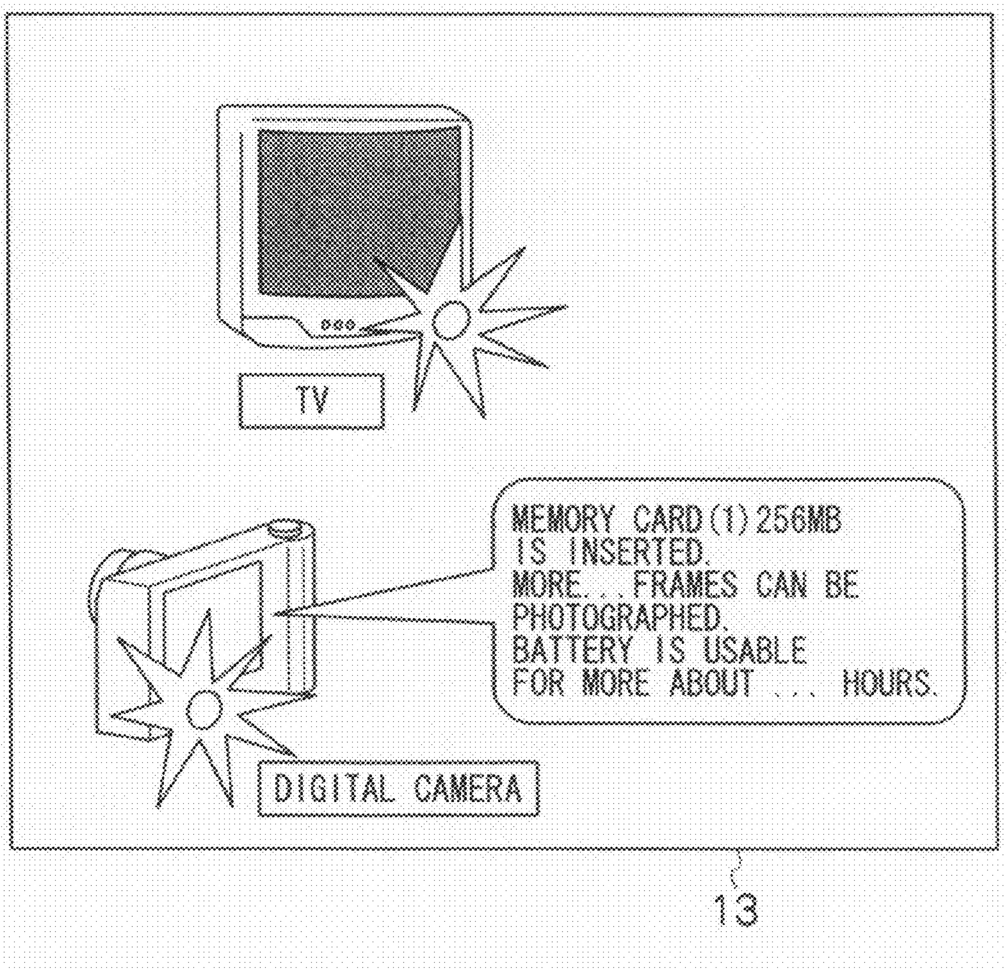
FIG. 12 is a view illustrating how the apparatus information superimposed on the still image is displayed.

The remote control device 1 receives information on the apparatus, and displays it superimposed on the still image on the display part 13, as shown in FIG. 12. Alternatively, the information on the apparatus may be notified by means of the transmitter/receiver part 19.

In this manner, after the power of the apparatus 2 is turned on to enable the remote control, it is easy to know the state of the apparatus 2, and possible to make the adequate control in response to it.

Sixth Embodiment

The apparatus 2 may transmit information on the charging state of the apparatus as the apparatus inherent information while charging, irrespective of whether or not the power is turned on.

Figure 13:
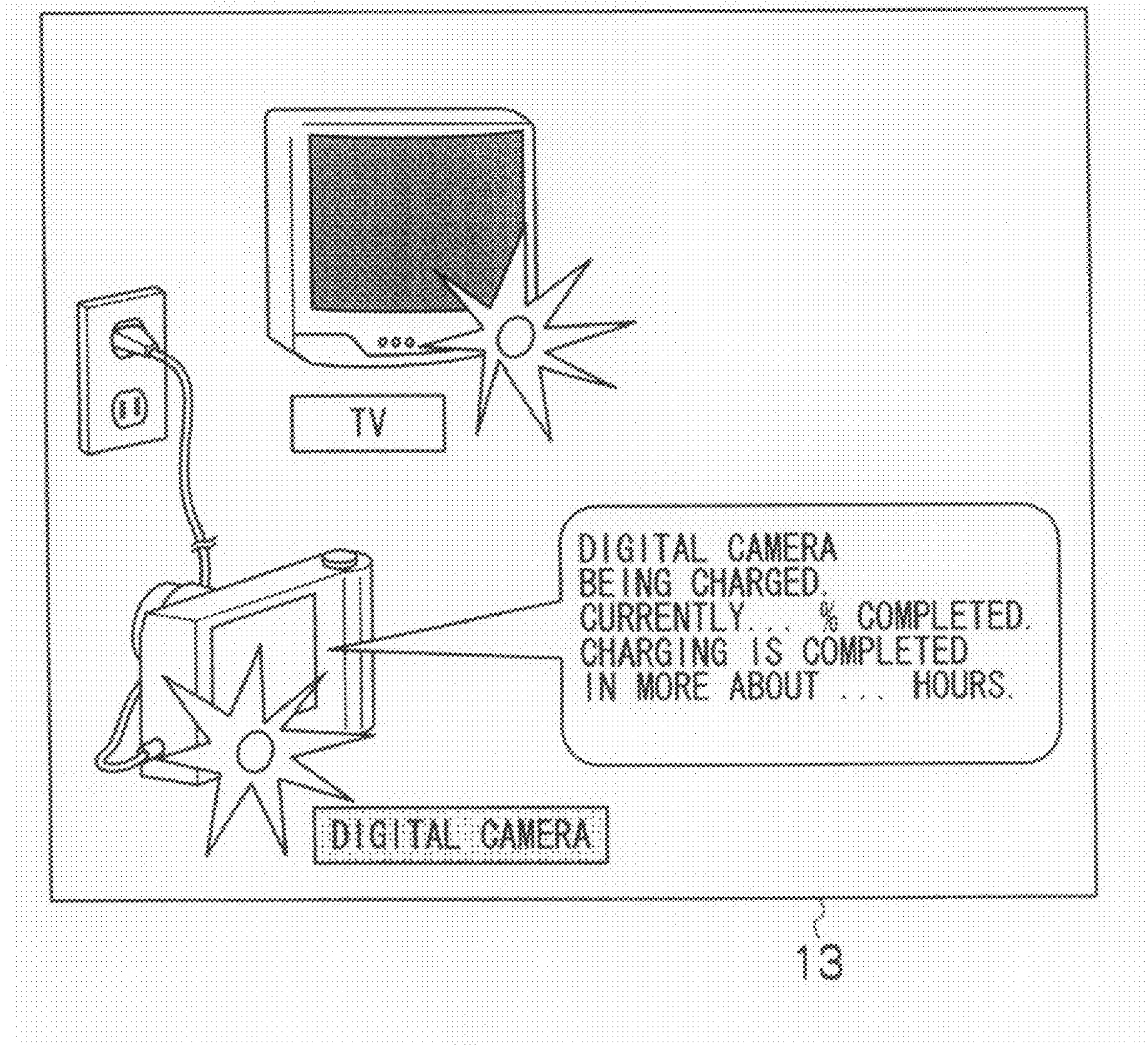
FIG. 13 is a view illustrating how the charging status information superimposed on the still image is displayed.

The remote control device 1 receives information on the charging state from the apparatus 2 selected by manual input on the operation part 14 or voice input into the transmitter/receiver part 19, and displays this information superimposed on the still image on the display part 13, as shown in FIG. 13. The information on the charging state may be notified by voice from the transmitter/receiver part 19.

Thus, the user can easily know the progress situation of charging the desired apparatus 2 without going to the face of the apparatus for confirmation, and after completion of charging, the remote control can be started quickly.

What is claimed is:

1. A remote control device comprising:

an acquisition part that acquires continuously an image of an apparatus to be remotely controlled as a subject and an information inherent to the apparatus optically emitted from the apparatus using an image pickup element;

a display part that superimposes and displays the image acquired continuously by the acquisition part and the information inherent to the apparatus;

an instruction accepting part that accepts an instruction of selecting a desired apparatus subject to remote control among the apparatuses from which the inherent information is acquired and selecting a desired control content for the selected apparatus from a user;

a control signal transmission part that transmits a remote control signal to the apparatus;

a remote control part that controls the control signal transmission part to transmit a remote control signal corresponding to the control content of the apparatus selected by the instruction accepting part to the apparatus selected by the instruction accepting part; and an operation situation judgment part that judges a presence or absence of the operation of the apparatus in accordance with the remote control signal depending on a changing brightness of the image acquired continuously by the acquisition part, wherein the display part displays information of a content in accordance with a judgment of the operation situation judgment part.

2. The remote control device according to claim 1, wherein the remote control part transmits the remote control signal again if the operation situation judgment part judges that the apparatus is not operated in accordance with the remote control signal.

3. The remote control device according to claim 2, wherein the remote control part transmits the remote control signal only by a certain number of times if the operation situation judgment part judges that the apparatus is not operated in accordance with the remote control signal.

4. The remote control device according to claim 3, wherein the display part displays prescribed information after the remote control part transmits the remote control signal only by the certain number of times if the operation situation judgment part judges that the apparatus is not operated in accordance with the remote control signal.

5. The remote control device according to claim 1, wherein the operation situation judgment part judges whether or not the power of the apparatus is turned on in accordance with a remote control signal corresponding to the control content that the power of the apparatus is turned on, and the display part displays information concerning the controllable content after the power of the apparatus is turned on if the operation situation judgment part judges that the power of the apparatus is turned on.

6. The remote control device according to claim 2, wherein the operation situation judgment part judges whether or not the power of the apparatus is turned on in accordance with a remote control signal corresponding to the control content that the power of the apparatus is turned on, and the display part displays information concerning the controllable content after the power of the apparatus is turned on if the operation situation judgment part judges that the power of the apparatus is turned on.

7. The remote control device according to claim 3, wherein the operation situation judgment part judges whether or not the power of the apparatus is turned on in accordance with a remote control signal corresponding to the control content that the power of the apparatus is turned on, and the display part displays information concerning the controllable content after the power of the apparatus is turned on if the operation situation judgment part judges that the power of the apparatus is turned on.

8. The remote control device according to claim 4, wherein the operation situation judgment part judges whether or not the power of the apparatus is turned on in accordance with a remote control signal corresponding to the control content that the power of the apparatus is turned on, and the display part displays information concerning the controllable content after the power of the apparatus is turned on if the operation situation judgment part judges that the power of the apparatus is turned on.

9. A remote control method comprising:

a step of acquiring continuously an image of an apparatus to be remotely controlled as a subject and an information inherent to the apparatus optically emitted from the apparatus using an image pickup element;

a step of superposing and displaying the image acquired continuously and the information inherent to the apparatus;

a step of accepting an instruction of selecting a desired apparatus subject to remote control among the apparatuses from which the inherent information is acquired and selecting a desired control content for the selected apparatus from a user;

a step of transmitting a remote control signal corresponding to the control content of the selected apparatus to the selected apparatus;

a step of judging the presence or absence of the operation of the apparatus in accordance with the remote control signal depending on a changing brightness of the image acquired continuously; and a step of displaying information of the content in accordance with a judgment as to the presence or absence of the operation of the apparatus.

* * * * *